(12) United States Patent
Akechi et al.

(10) Patent No.: US 9,650,729 B2
(45) Date of Patent: May 16, 2017

(54) COATED FABRIC FOR AIRBAG, AND PROCESS FOR PRODUCING COATED FABRIC FOR AIRBAG

(71) Applicant: Toyobo Co., Ltd., Osaka-shi, Osaka (JP)

(72) Inventors: Tsutomu Akechi, Otsu (JP); Mamoru Kitamura, Osaka (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/377,252

(22) PCT Filed: Feb. 6, 2013

(86) PCT No.: PCT/JP2013/052692
§ 371 (c)(1),
(2) Date: Aug. 7, 2014

(87) PCT Pub. No.: WO2013/118755
PCT Pub. Date: Aug. 15, 2013

(65) Prior Publication Data
US 2015/0017859 A1    Jan. 15, 2015

(30) Foreign Application Priority Data
Feb. 7, 2012  (JP) .................................. 2012-023849

(51) Int. Cl.
*D03D 1/02* (2006.01)
*B60R 21/235* (2006.01)
(Continued)

(52) U.S. Cl.
CPC ............. *D03D 1/02* (2013.01); *B60R 21/235* (2013.01); *D03D 13/008* (2013.01); *D03D 15/00* (2013.01);
(Continued)

(58) Field of Classification Search
CPC .......... B60R 2021/23514; B60R 21/35; D03D 13/008; D03D 15/00; D03D 1/02;
(Continued)

(56) References Cited

U.S. PATENT DOCUMENTS 6,632,754 B1 * 10/2003 Rose, III .................. D03D 1/02
442/168
7,572,744 B1 * 8/2009 Ikenaga .................. D03D 15/08
139/420 A
(Continued)

FOREIGN PATENT DOCUMENTS

| CN | 101883891 | 11/2010 |
|---|---|---|
| JP | 2853936 | 1/1994 |

(Continued)

OTHER PUBLICATIONS

Japanese Patent Office, International Search Report for PCT/JP2013/052692 with English translation (Apr. 16, 2013).
(Continued)

*Primary Examiner* — Arti Singh-Pandey
(74) *Attorney, Agent, or Firm* — FIsh & Richardson P.C.

(57) ABSTRACT

The present invention is coated fabric for airbags which is obtained by applying a silicone resin to at least one surface of woven fabric constituted of synthetic fiber filaments, in an amount of 20 g/m² or less. The coated fabric is characterized in that in the uncoated base fabric, the warp crimp ratio is less than the weft crimp ratio, the warp crimp ratio is 4% or less, and the difference between the warp crimp ratio and the weft crimp ratio is 0.8-3.0%, and that the coated fabric has a air permeability, measured at a differential pressure of 100 kPa, of 0.02 L/cm²/min or less. Although the amount of the resin applied is 20 g/m² or less, extremely low air permeability is ensured.

6 Claims, 1 Drawing Sheet

(51) Int. Cl.
  *D06M 15/643* (2006.01)
  *D03D 13/00* (2006.01)
  *D06N 3/00* (2006.01)
  *D06N 3/12* (2006.01)
  *D03D 15/00* (2006.01)

(52) U.S. Cl.
  CPC ........ *D06M 15/643* (2013.01); *D06N 3/0006* (2013.01); *D06N 3/0088* (2013.01); *D06N 3/128* (2013.01); *B60R 2021/23514* (2013.01); *D06N 2209/125* (2013.01); *D06N 2211/268* (2013.01); *D10B 2331/02* (2013.01); *D10B 2505/124* (2013.01); *Y10T 442/322* (2015.04)

(58) Field of Classification Search
  CPC .......... D06M 15/643; D06N 2209/125; D06N 2211/268; D06N 3/0006; D06N 3/0088; D06N 3/128; D10B 2331/02; D10B 2505/124; Y10T 442/322
  See application file for complete search history.

(56) References Cited

U.S. PATENT DOCUMENTS

| | | | | |
|---|---|---|---|---|
| 2006/0019561 | A1* | 1/2006 | Schindzielorz | B60R 21/235 442/59 |
| 2009/0314378 | A1* | 12/2009 | Huber | D03D 1/02 139/389 |
| 2010/0282358 | A1 | 11/2010 | Kano et al. | |
| 2011/0097956 | A1 | 4/2011 | Kano et al. | |
| 2012/0015573 | A1* | 1/2012 | Akechi | D03D 1/02 442/59 |
| 2013/0189887 | A1* | 7/2013 | Akechi | D03D 1/02 442/60 |
| 2014/0021705 | A1* | 1/2014 | Youn | B60R 21/235 280/730.1 |

FOREIGN PATENT DOCUMENTS

| | | | | |
|---|---|---|---|---|
| JP | 11227550 | | 8/1999 | |
| JP | 2000-303303 | | 10/2000 | |
| JP | 2005-105446 | | 4/2005 | |
| JP | 2008-138305 | | 6/2008 | |
| JP | 2008-285766 | | 11/2008 | |
| JP | 2010/137282 | | 12/2010 | |
| JP | 2011-058118 | | 3/2011 | |
| JP | 2012-007289 | | 1/2012 | |
| WO | WO 2010137282 | * | 12/2010 | ........... B60R 21/235 |

OTHER PUBLICATIONS

Japanese Office Action issued for Japanese Patent Appln. No. 2013-557538, dated Dec. 2, 2015 (with English translation).
Chinese Office Action issued for Chinese Patent Appln No. 201380008224.0, dated Aug. 4, 2015 (with English translation).
Extended European Search Report (EESR) mailed on Sep. 11, 2015 in counterpart application No. EP 13746834.4.

* cited by examiner

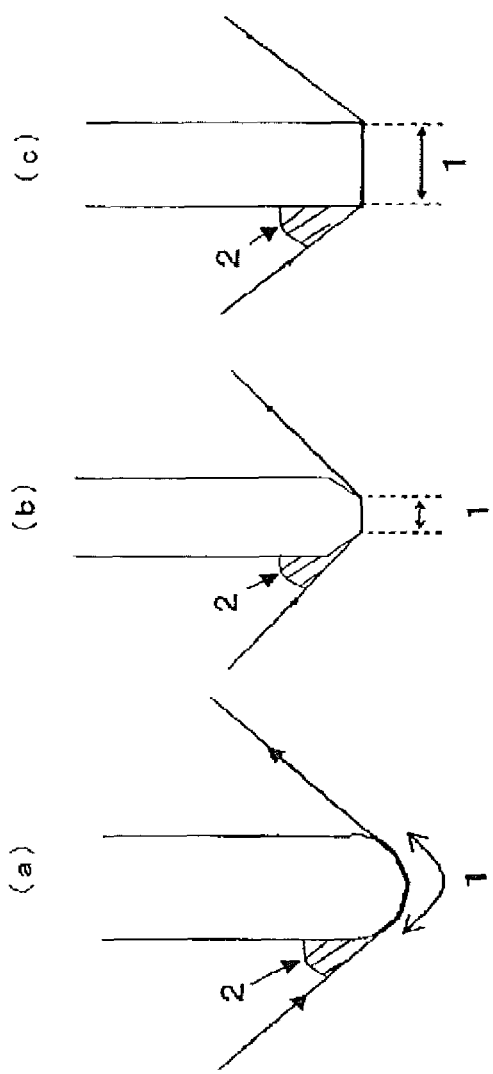

COATED FABRIC FOR AIRBAG, AND PROCESS FOR PRODUCING COATED FABRIC FOR AIRBAG

TECHNICAL FIELD

The present invention relates to a coated fabric used for an airbag for cars. In particular, the present invention relates to a coated fabric for an airbag that achieves low air permeability even when a coating amount attached to a fabric is small.

BACKGROUND ART

An airbag which has been quickly increasing in its installing rate in recent years as one of the safety parts for cars is used for such a purpose that, in car collisions, a sensor perceives the shock, gas of high temperature and high pressure is generated from an inflator and the airbag is quickly developed by the gas whereby the collision of the bodies or, particularly, the heads of a driver and a passenger to steering wheel, windshield, door glass, etc. is prevented and protected. In recent years, airbags for cars have been developed in their practical use not only for a driver seat and a passenger seat but also for knee airbags, side airbags, curtain airbags, etc. and installment of a plurality of airbags is now becoming common.

As regions and numbers of the installed airbags are increasing, there has been an increasing demand for making the weight and the size of an airbag system lighter and more compact and each of the parts of the system has been designed with a target of making the weight lighter and the size more compact. In view of such a background, airbags have been investigated for a plan of using a fabric where the yarn of small fineness is used or for a plan of reducing the type of elastomer of a coating textile and the coating amount.

For example, fineness of a filament used in a coated fabric for airbags is becoming finer from 940 dtex to 470 dtex and, in recent years, there has been a change to a fabric using the filaments where fineness is 350 dtex.

Furthermore, an elastomer resin which is coated to a coated fabric for airbags has been also changed from chloroprene to silicone resin. The coating amount has been changed from 90 to 120 $g/m^2$ to 40 to 60 $g/m^2$ and, in recent years, has been reduced to 25 to 40 $g/m^2$. Although package ability of the airbag has been significantly improved by these means, the package ability has not reached satisfactory level. Therefore, improved package ability and weight reduction by further reduction of the coating amount are desired.

On the other hand, although a coated fabrics applied with synthetic rubbers or resins such as silicone for airbags such as side airbags, curtain airbags, and knee airbags for which an internal pressure retention performance is particularly required are mainly used, the resin film is easy to break and extremely low air permeability is difficult to maintain due to extreme reduction of a resin amount existed on the surface when the resin amount is reduced to 20 $g/m^2$ or less.

With regard to a coated fabric for airbags where the coating weight of silicone resin is reduced, there is a disclosure for an airbag where elastomer is unbalancedly present in terms of a coating thickness ratio of not less than 3.0 in the knotted area of the textile to 1.0 of textile yarn area which constitutes the textile (see Patent Document 1). Although the package ability of the airbag is improved, the resin film is easy to break in the state that the resin is unevenly distributed as described above when the resin amount is adjusted to 20 $g/m^2$ or less. As a result, it is difficult to satisfy the low air permeability to the airbags for which an internal pressure retention performance is particularly required.

There is also a disclosure for a coated fabric for airbags where not less than 90% of the outer circumstances of the cross sections of warp and weft positioned at the resin-coated surface of the synthetic fiber textile are surrounded by said resin and the coating weight of the resin is not more than 20 $g/m^2$ (see claim 2 of Patent Document 2). Although adhesion between the fabric and the resin is improved by impregnating the resin, the resin film is easy to break in a similar manner due to a thin resin film existed on the textile surface. As a result, it is difficult to satisfy the low air permeability to the airbags for which an internal pressure retention performance is particularly required.

PRIOR ART DOCUMENTS

Patent Documents

Patent Document 1: JP 2853936 B1
Patent Document 2: JP-A-2008-138305

SUMMARY OF THE INVENTION

Problems to be Solved by the Invention

An object of the present invention, which cannot have been solved by the related arts, is to provide a coated fabric for an airbag ensuring sufficient low air permeability even when a coating amount of a resin is 20 $g/m^2$ or less.

Solutions to the Problems

The present invention provides a technique in which air permeability of a coated fabric for airbag made by applying a silicone resin of 20 $g/m^2$ or less can be reduced under high pressure (under a differential pressure of 100 kPa) by setting a crimp percentage difference of a base fabric before coating to a predetermined range even when the coating amount of the resin is small.

Effects of the Invention

The coated fabric for airbag of the present invention has low air permeability even when the coated fabric has thin coating. Therefore, even the airbag for which a high internal pressure retention performance is particularly required, the coated fabric has advantages of high reliability, compact packing, and less restriction of design for interior of a car.

BRIEF DESCRIPTION OF THE DRAWINGS

The Figure is a schematic view of a front end shape of a blade of a knife coat used in the present invention.

MODE FOR CARRYING OUT THE INVENTION

The coated fabric for airbag of the present invention, which can solve the problems described above, has the following constitution.

1. A coated fabric for airbags made by applying 20 $g/m^2$ or less of a silicone resin to at least one surface of a textile constituted by synthetic fiber filaments, wherein the coated fabric has a warp crimp ratio smaller than a weft crimp, the warp crimp ratio of 4% or less, and a difference between the weft crimp ratio and the warp crimp ratio of 0.8% to 3.0%, and wherein an air permeability of the coated fabric under a differential pressure of 100 kPa is 0.02 L/cm$^2$/min or less.

2. A coated fabric for airbags made by applying 20 g/m$^2$ or less of a silicone resin to at least one surface of a textile constituted by synthetic fiber filaments, wherein a fabric before coating has a warp crimp ratio smaller than a weft crimp, the warp crimp ratio of 4% or less, and wherein an air permeability of the coated fabric under a differential pressure of 100 kPa is 0.02 L/cm$^2$/min or less.

3. The coated fabric for airbags according to 1 or 2, wherein a warp tension of the fabric at weaving is not less than 0.16 cN/dtex and not more than 0.40 cN/dtex.

4. The coated fabric for airbags according to any one of 1 to 3, wherein a whole fineness of the filaments constituting the textile is 200 dtex to 470 dtex.

5. The coated fabric for airbags according to any one of 1 to 4, wherein a cover factor of the textile is 1,800 to 2,500.

6. A process for producing the coated fabric for airbags according to any one of 1 to 5, wherein a method for applying the resin is a knife coating method; a front end radius of the knife used is 0.5 mm or less; and a tension in a length direction of the textile at the knife coating is 0.10 cN/dtex or less.

This invention is described in detail below. The textile constituted from synthetic fiber filament in the present invention means a textile which is woven using synthetic fiber filament thread. The textile is excellent in mechanical strength and is excellent in such a respect that thickness can be made thin. With regard to the tissue of the textile, there may be applied plain weave, twill weave, satin weave and variant weave thereof, multiaxial weave, etc. and, among them, plain weave which is excellent in mechanical strength is particularly preferred.

With regard to the synthetic fiber, the particularly used ones thereof are aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate. Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, etc. can be used. However, when economy is taken into consideration, the polyester fiber and the polyamide fiber are preferred and the polyamide 66 is particularly preferred. In those fibers, a part of or all of them may be prepared from the recycled raw materials.

In the synthetic fibers as such, various kinds of additives may be contained therein for a purpose of enhancing the step passing property in the manufacturing step for starting yarn or the after-processing step. Examples of the additive used therefore include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn may be the ordinary round cross section and the differently shaped cross section. It is preferred to use multifilament yarn of 72 filaments or more for the synthetic fiber in view of softness and flatness of the coated surface.

The coated fabric of the present invention may be a both-side-coated one where coating is done on both sides of the textile but, in view of the package ability, a single-side-coated one where coating is done merely on one side is more preferred.

As the coating resin, a silicon resin having heat resistance, cold resistance, and flame retardancy is best. Specific examples of the silicone resin include an addition polymerization silicone rubber. Examples of the silicone resin include dimethylsilicone rubber, methylvinylsilicone rubber, methylphenylsilicone rubber, trimethylsilicone rubber, fluorosilicone rubber, methylsilicone rubber, methylphenylsilicone rubber, methylvinylsilicone rubber, epoxy-modified silicone rubber, acrylic-modified silicone rubber and polyester-modified silicone rubber. Among them, the particularly suitable one is methylvinylsilicone rubber which has rubber elasticity after hardening, shows excellent strength and elongation and is advantageous in terms of cost.

When the silicone type resin is used, it is also possible to use a reaction hardening agent and, for example, there may be used a platinum compound such as platinum powder, platinic chloride or platinic tetrachloride; a palladium compound; a rhodium compound; and an organic peroxide such as benzoyl peroxide, p-chlorobenzoyl peroxide and o-chlorobenzoyl peroxide.

It is preferred that an adhesive aid is made to contain in the silicone resin for enhancing the adhesive property between the silicone rubber and the fabric. Examples of the adhesive aid include, but are not limited, at least one or more member(s) selected from the group consisting of amino silane coupling agent, epoxy-modified silane coupling agent, vinyl silane coupling agent, chlorine silane coupling agent and mercapto silane coupling agent.

An inorganic filler to be added to the silicone rubber has been already used as a filler for a purpose of reinforcement of silicone rubber, adjustment of viscosity, enhancement of heat resistance, enhancement of flame retarding property, etc. and the most representative filler is silica particles. Specific surface area of the silica particles is preferred to be not less than 50 m$^2$/g, more preferred to be 50 to 400 m$^2$/g and more preferred to be 100 to 300 m$^2$/g. When the specific surface area is within this range, excellent tear strength is apt to be given to the resulting hardened silicone. The specific surface area is measured by a BET method. One type of the silica particles may be used solely or two or more thereof may be used jointly. Examples of the silica particles used in the present invention include a natural one such as quartz, rock crystal or diatomaceous earth and a synthetic one such as dry silica, silica fume, wet silica, silica gel or colloidal silica.

The above-mentioned silica particles are preferred to be hydrophobic silica particles where the particle surface is subjected to a hydrophobic treatment using an organosilicon compound such as methylchlorosilane (e.g., trimethylchlorosilane, dimethyldichlorosilane and methyltrichlorosilane), dimethylpolysiloxane or hexaorganodisilazane (e.g., hexamethyldisilazane, divinyltetramethyldisilazane and dimethyltetravinyldisilazane) whereby better fluidity is apt to be given to the resin composition containing silicone rubber and additive.

Amount of the silica particles contained therein is preferred to be 10 to 20% by mass and more preferred to be 12 to 20% by mass to all of the silicone resin. When the amount of the silica particles is less than 10% by mass, the mechanical strength of the silicone rubber is apt to become low. On the other hand, when the amount of the silica particles is more than 20% by mass, fluidity of the resin composition is apt to become low and not only the coating work is deteriorated but also the resin becomes brittle resulting in the tendency that the adhesive property is reduced.

An air permeability under a differential pressure of 100 kPa of the coated fabric of the present invention is required to be 0.02 L/cm²/min or less. An inner pressure of 30 to 50 kPa is applied at the time of development of a common airbag. In addition, heat caused by explosion of an inflator is also affected. Therefore, the air permeability should be discussed under a differential pressure of 100 kPa when the air permeability of a cloth is measured at standard conditions. Preferably, the air permeability is 0.01 L/cm²/min or less. When the air permeability under a differential pressure of 100 kPa is more than 0.02 L/cm²/min, occupant restraint performance for side airbags, curtain airbags, and knee airbags for which an internal pressure retention performance is particularly required is insufficient, and thus, this range of the air permeability is not preferable.

Usually, when an attached amount of the resin is reduced, a film thickness of the resin existing on the fabric surface is thin. As a result, the coated resin film is easy to break under high pressure such as under a differential pressure of 100 kPa, and thus the air permeability is increased. However, the inventors of the present invention have found a novel technological idea, which can solve the problems that cannot have been solved by related arts, that satisfies both low coating amount of the resin and air permeability property under high pressure even when a coating amount is 20 g/cm² or less by controlling a crimp ratio of the base fabric before coating in the predetermined range to set a crimp ratio of the base fabric after coating in a predetermined range. Specifically, the present invention provides a coated fabric for airbags having a warp crimp ratio smaller than a weft crimp ratio of the fabric after coating, the warp crimp ratio of the coated fabric of 4% or less, a difference between the weft crimp ratio and the warp crimp ratio of 0.8 to 3.0%, and an air permeability under a differential pressure of 100 kPa of 0.02 L/cm²/min or less formed by using a base fabric having a warp crimp ratio of 4% or less of the fabric before coating, the warp crimp ratio smaller than the weft crimp ratio, and a difference between the weft crimp ratio and the warp crimp ratio of 0 to 3%, and by setting a fabric tension at coating to a predetermined range.

It has been known that when a high density textile such as a base fabric for airbags having a cover factor exceeding 1800 is produced, a warp crimp ratio is larger than a weft crimp ratio because many wefts are woven. In the present invention, however, the inventors of the present invention have found a method that satisfies both low coating amount of the resin and air permeability property under high pressure as a coated cloth by designing the coated fabric having a warp crimp ratio smaller than a weft crimp ratio, the warp crimp ratio of 4% or less, and a difference between the warp crimp ratio and the weft crimp ratio of 0 to 3%. A method for setting the warp crimp ratio smaller than the weft crimp ratio and setting the warp crimp ratio of 4% or less has no particular limitation. For example, a method such as AJL for increasing a crimp ratio in a weft direction by using a looming machine applying relatively low tension in a weft direction at weaving, and a method for increasing tension in a cloth running direction as high as possible at the time of scouring and drying after weaving can be considered. However, a method for increasing warp tension at weaving in a possible range is preferably used. As a warp tension at conventional weaving, a warp tension of 0.15 cN/dtex or less is preferably used in a cover factor of around 2000. In the present invention, however, a warp tension of 0.16 cN/dtex or more, more preferably 0.18 cN/dtex or more, and further preferably 0.20 cN/dtex or more is used. An upper limit is not particularly limited. When the warp tension is too high, generation of fluff caused by thread breakage is observed. Therefore, the warp tension is preferably 0.40 cN/dtex or less and more preferably 0.36 cN/dtex or less. In addition to these methods, a crimp ratio in the warp direction to a crimp ratio in the weft direction tends to be in the range of the present invention by a method for designing the coated fabric so that a weaving density in the warp direction is smaller than a weaving density in the weft direction at weaving by 2% or more, preferably 3% or more, and more preferably 3.5% or more. Therefore, this method is preferable. When a weaving density difference between the warp direction and the weft direction exceeds 10%, isotropy of a fabric is lost. Therefore, the weaving density difference is preferably 9% or less, more preferably 8% or less, and further preferably 6% or less.

The crimp ratio may tend to be within the range of the present invention because tension to the warps is easier to be applied by reducing the number of warps at fabric weaving.

Tension is also applied in a length direction of the textile at coating and this tension is preferably set to 0.01 to 0.10 cN/dtex. By setting the tension within this range, the crimp ratio of the fabric after coating is within the range of the present invention and both low coating amount of the resin and air permeability property under high pressure can be satisfied. The reason why the air permeability property under high pressure is achieved is not clear. However, wefts in which tension at coating is applied to a perpendicular direction to a fiber axis direction may spread filaments of the wefts in a running direction of the cloth associated with warp movement at coating, and thus, the filaments tend to fill the voids of the fabric. As a result, low air permeability of the fabric after coating may be retained.

When the difference between the weft crimp ratio and the warp crimp ratio before coating is higher than 3%, this shows that the warps are elongated to the upper limit or the weft crimp ratio is too large. In this case, the weft movement associated with warp movement at coating cannot be sufficiently carried out, and thus, the voids of the fabric cannot be filled. The difference is more preferably 0 to 2.5%. By setting the warp crimp ratio of the fabric before coating to 4% or less, contact pressure by a knife and movement of the fabric by the tension applied in the length direction of the textile are suppressed and thus the fabric can be dried and cured in the form in which the resin is not penetrated inside of the textile and covers the fabric surface. Therefore, the low air permeability of the fabric after coating may be maintained. When the warp crimp ratio is higher than 4%, many voids exist in the fabric itself before coating. Therefore, the resin is penetrated into the voids and a low coating amount of 20 g/m² or less is difficult to achieve. Similarly, when tension is applied at coating, voids are also generated because the warp movement is large. Therefore, the fabric surface cannot be sufficiently covered even when a low coating amount of 20 g/m² is achieved because the resin is penetrated inside of the fabric. As a result, the air permeability after coating is not preferable.

It is essential that the warp crimp ratio of the coated fabric is smaller than the weft crimp ratio and the difference between the warp crimp ratio and the weft crimp ratio is 0.8 to 3.0%. When the fabric has this difference crimp ratios, the fabric surface is relatively smooth and, at the same time, the voids between the fibers in the fabric are reduced. In the case of the low coating amount of 20 g/m² or less, an air permeability of 0.02 L/cm²/min or less of the coated fabric under a differential pressure of 100 kPa can be achieved. The difference between the weft crimp ratio and the warp crimp ratio is preferably 1.0 to 2.9%, and more preferably 1.5 to 2.8%.

A viscosity of a silicone resin used in the present invention is preferably 15 to 60 Pa·sec and more preferably 20 to 50 Pa·sec. Generally, setting of high film strength and elongation of a silicone resin can be achieved by increasing a resin viscosity. When the resin viscosity is 60 Pa·sec or more, a coating amount is difficult to be adjusted to 20 g/m² or less. On the other hand, when the resin viscosity is less than 15 Pa·sec, desired coating film properties of the silicone resin cannot be obtained as well as a required resin thickness for achieving the low air permeability is difficult to ensure because the resin is penetrated inside of the textile. As long as the viscosity can be adjusted within the viscosity range described above, either a solvent-based resin or a non-solvent-based resin can be used. Considering effects to environment, however, the non-solvent-based resin is preferable.

In the present invention, when a resin composition contains additives other than the resin, the viscosity of the resin composition is defined as a "viscosity of the resin".

In the present invention, in order to design the coated fabric that realizes low air permeability when the coating amount of the resin is a small amount of 20 g/m² or less, a coating method of the resin is important.

As methods for applying the resin, conventionally known methods are used and a knife coating method is the most preferable method from the viewpoint of easiness of adjustment of the coating amount and less effect of foreign matter (projection) contamination. In the present invention, a knife used at knife coating having a front end shape of a blade such as a semicircle shape or an angular shape can be used (refer to FIG. 1).

In order to reduce the coating amount of the resin to an extent of not more than 20 g/m² by a knife coating, it is effective to enhance the tension of the fabric in the direction of contacting pressure or, particularly, in the length direction of the fabric. However, in the knife blade which has been conventionally used for the knife coating, the radius of the front end is 0.7 mm even in the sharp one when the front end is in semicircular shape. Therefore, in order to reduce the coating amount of the resin to an extent of not more than 20 g/m², it is necessary that the tension of the fabric in the length direction of the fabric is made considerably high. As a result, the difference between the warp crimp ratio and the weft crimp ratio becomes larger, and thus, a phenomenon that a thickness of the resin film in the direction of the larger crimp ratio is reduced occurs. As a result, even when the difference between the warp crimp ratio and the weft crimp ratio is designed to be 3.0% or more before coating, the difference between the warp crimp ratio and the weft crimp ratio at pressure relaxation after coating becomes larger and thus a phenomenon that a thickness of the resin film in the direction of the larger crimp ratio is reduced occurs. As a result, even when the base fabric before coating having a warp crimp ratio smaller than a weft crimp ratio, the warp crimp ratio of 4% or less, and a difference between the warp crimp ratio and the weft crimp ratio being 0 to 3% is designed, the coating film breaks at pressure loading and thus the low air permeability cannot be maintained.

On the other hand, in the present invention, when the coated fabric is produced using knife coating, a knife blade having a front end radius (R) of less than 0.5 mm is preferably used. Further preferably, coating is carried out by using a knife blade having R of 0.3 mm or less under conditions of reduced fabric tension. As described above, use of the knife blade sharper than conventional knife blades can reduce an attached amount of the resin without increasing the tension of the fabric and thus crimp ratios in the warp direction and weft direction can be uniformed. As a result, the film thickness of a silicone resin on the textile surface can be controlled in a thick thickness and thus extremely air permeability performance can be maintained. The front end radius of the knife blade can be measured with a radius gauge or a displacement measuring device using laser light.

The tension in the length direction of the textile in the knife coating is preferably 0.10 cN/dtex or less and particularly preferably 0.08 cN/dtex. When the tension in the length direction of the textile is larger than 0.10 cN/dtex, movement of the fabric by the tension applied in the length direction of the textile at pressure loading under the knife becomes larger and the low air permeability cannot be maintained even when the base fabric before coating having a warp crimp ratio smaller than a weft crimp ratio, the warp crimp ratio of 4% or less, and a difference between the warp crimp ratio and the weft crimp ratio of 0 to 3% is designed.

As conditions for determining the coating amount, a compressing amount of the knife is also affected. However, a too much compressing amount of the knife results in large movement of the fabric at pressure relaxation after coating and thus a film forming uniform thickness is difficult to be applied at a low coating amount of 20 g/cm² or less.

In drying and hardening the coating agent after the application, the common heating methods such as hot air, infrared ray or microwave may be used. With regard to heating temperature and time, it will do if the temperature reaches the sufficient one for hardening the silicone resin and it is preferred that the heating temperature is 150 to 220° C. and the heating time is 0.2 to 5 minute(s).

The total fineness of the filament thread constituting the textile is preferred to be 200 to 470 dtex. When the total fineness is more than 470 dtex, the thickness of the fabric increases whereupon the storing ability of airbag is apt to be deteriorated. On the other hand, when the total fineness is less than 200 dtex, mechanical characteristics of the airbag upon working such as tensile strength and tear mechanical characteristic of the coated fabric are apt to become low.

Cover factor of the textile to be used as a fabric is preferred to be 1,800 to 2,500 and more preferred to be 1,900 to 2,450. When the cover factor is less than 1,800, physical properties (tensile strength and tearing strength) required for airbags are deteriorated. On the other hand, when the cover factor exceeds 2,500, limitation at the time of weaving and limitation of package ability arise. Incidentally, the cover factor CF is calculated by the following formula.

$$CF=\sqrt{(\text{total fineness of warp})} \times \text{warp density} + \sqrt{(\text{total fineness of weft})} \times \text{weft density}$$

Unit for the total fineness is dtex and that for the weaving density is thread numbers/2.54 cm.

EXAMPLES

As hereunder, the present invention will be specifically illustrated by way of Examples although the present invention is not limited to those Examples. Incidentally, various evaluations in the Examples were done according to the following methods.

(1) Fineness

This was measured according to the method mentioned in JIS L-1095 9.4.1.

(2) Filament Numbers

Filament numbers were counted from the cross-sectional picture of the filament thread.

(3) Density of Textile

This was measured according to the method mentioned in JIS L-1096 8.6.1.

(4) Crimp Ratio

This was measured according to the method mentioned in JIS L-1096 6.7 B.

(5) Strength and Elongation of Silicone Resin Film

Silicone resin films having a uniform thickness of 0.5 mm were prepared. Strengths and elongations at break were measured by a tensile test at a chuck distance of 10 mm and at a speed of 10 mm/min. As the drying temperature and time, actual conditions when the cloth was applied and the resin was cured were employed.

(6) Coating Amount

Mass of the coated fabric was measured according to the method mentioned in JIS L-1096 8.4.2. After that, as a blank sample, the processing treatment was carried out without coating the resin under the same condition at the coating and then mass of the resulting blank sample was measured according to the method mentioned in JIS L-1096 8.4.2. After that, the difference between the mass of the coated fabric and the mass of the blank sample was calculated as the coating amount. Incidentally, coating weight ($g/m^2$) was expressed in terms of the mass ($g/m^2$).

(7) Air Permeability

Air permeability under a pressure of 100 kPa was measured using a high pressure air permeability tester (manufactured by OEM System).

(8) Tension at Coating

At coating, a tension was set so as to be the predetermined tension using the tension indicated from a torque of the roller in the cloth winding side. A value calculated by dividing the obtained value with a cloth width, a weaving density of warps, and a fineness was used.

(9) Warp Tension at Weaving

Using a thread tension tester, a tension applied per warp was measured at an intermediate position between a warp beam and a back roller during operation of a looming machine. Five maximum values and five minimum values during a looming machine operation time of 10 minutes were extracted and the average value of them was calculated. A tension per warp was determined as a value calculated by dividing the average value with the fineness.

Example 1

Polyamide 66 multi-filament yarn comprising 72 filaments where the total fineness was 470 dtex was woven by plain weave in a water jet room. After that, the product was subjected to a shrinkage processing using boiling water and subjected to a dry finishing at 110° C. to give a textile where the warp density was 45 warp/2.54 cm, the weft density was 47 weft/2.54 cm and the cover factor was 1,994. At this time, a warp crimp ratio was 3.1% and a weft crimp ratio was 5.6%. To one side of this textile, a non-solvent-based silicone resin which was adjusted to a silicone resin film strength of 4.8 MPa, a film elongation of 378%, and a resin viscosity of 22 Pa·sec was applied by floating knife coating using a knife having a front end shape of semicircle shape and a front end radius R of 0.3 mm and setting a tension at coating in the length direction of the textile to 0.07 cN/dtex. In addition, curing treatment was carried out for 2 minutes at 190° C. to give a coated fabric having a coating amount of 15 $g/m^2$. Properties of the obtained coated fabric were evaluated and shown in Table 1. The obtained fabric indicated extremely low air permeability even though the low coating amount.

Example 2

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 45 warp/2.54 cm, the weft density was 47 weft/2.54 cm and the cover factor was 1,994. At this time, a warp crimp ratio was 3.9% and a weft crimp ratio was 4.7%. To one side of this textile, the same silicone resin was applied by the same coating method and conditions as Example 1 to give a coated fabric having a coating amount of 14 $g/m^2$. Properties of the obtained coated fabric were evaluated and shown in Table 1. The obtained fabric indicated extremely low air permeability even though the low coating amount.

Example 3

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 50 warp/2.54 cm, the weft density was 52 weft/2.54 cm and the cover factor was 2,211. At this time, a warp crimp ratio was 3.6% and a weft crimp ratio was 5.1%. To one side of this textile, the same silicone resin as Example 1 was applied by a floating knife coating using a knife having a front end shape of semicircle shape and a front end radius R of 0.3 mm and by setting a tension at coating in the length direction of the textile to 0.06 cN/dtex. In addition, curing treatment was carried out for 2 minutes at 190° C. to give a coated fabric having a coating amount of 16 $g/m^2$. Properties of the obtained coated fabric were evaluated and shown in Table 1. The obtained fabric indicated extremely low air permeability even though the low coating amount.

Example 4

Polyamide 66 multi-filament yarn comprising 108 filaments where the total fineness was 350 dtex was woven by plain weave in a water jet room. After that, the product was subjected to a shrinkage processing using boiling water and subjected to a dry finishing at 110° C. to give a textile where the warp density was 54 warp/2.54 cm, the weft density was 56 weft/2.54 cm and the cover factor was 2,058. At this time, a warp crimp ratio was 3.5% and a weft crimp ratio was 5.4%. To one side of this textile, the same silicone resin as Example 1 was applied by a floating knife coating using a knife having a front end shape of semicircle shape and a front end radius R of 0.3 mm and by setting a tension at coating in the length direction of the textile to 0.05 cN/dtex. In addition, curing treatment was carried out for 2 minutes at 190° C. to give a coated fabric having a coating amount of 18 $g/m^2$. Properties of the obtained coated fabric were evaluated and shown in Table 1. The obtained fabric indicated extremely low air permeability even though the low coating amount.

Example 5

To one side of the same textile as Example 1, the same silicone resin as Example 1 was applied by a floating knife coating using a knife having a front end shape of semicircle shape and a front end radius R of 0.2 mm and by setting a tension at coating in the length direction of the textile to 0.08 cN/dtex. In addition, curing treatment was carried out for 2 minutes at 190° C. to give a coated fabric having a coating amount of 10 g/m². Properties of the obtained coated fabric were evaluated and shown in Table 1. The obtained fabric indicated extremely low air permeability even though the low coating amount.

Comparative Example 1

Polyamide 66 multi-filament yarn comprising 72 filaments where the total fineness was 470 dtex was woven by plain weave in a water jet room. After that, the product was subjected to a shrinkage processing using boiling water and subjected to a dry finishing at 110° C. to give a textile where the warp density was 46 warp/2.54 cm, the weft density was 46 weft/2.54 cm and the cover factor was 1,994. At this time, a warp crimp ratio was 5.6% and a weft crimp ratio was 3.9%. To one side of this textile, the same silicone resin as Example 1 was applied by a floating knife coating using a knife having a front end shape of semicircle shape and a front end radius R of 0.3 mm and by setting a tension at coating in the length direction of the textile to 0.03 cN/dtex. In addition, curing treatment was carried out for 2 minutes at 190° C. to give a coated fabric having a coating amount of 20 g/m². Properties of the obtained coated fabric were evaluated and shown in Table 1. The obtained fabric had extremely poor air permeability performance. This is because the coating resin may penetrate inside of the fabric by movement of the fabric generated at coating and thus the attached amount may exceed 20 g/m² and the coating film may not be formed at the predetermined position for reducing air permeability. As a result, reduction in air permeability may not be achieved.

Comparative Example 2

Polyamide 66 multi-filament yarn comprising 72 filaments where the total fineness was 470 dtex was woven by plain weave in a water jet room. After that, the product was subjected to a shrinkage processing using boiling water and subjected to a dry finishing at 110° C. to give a textile where the warp density was 46 warp/2.54 cm, the weft density was 46 weft/2.54 cm and the cover factor was 1,994. At this time, a warp crimp ratio was 5.0% and a weft crimp ratio was 4.2%. To one side of this textile, the same silicone resin as Example 1 was applied by a floating knife coating using a knife having a front end shape of semicircle shape and a front end radius R of 0.3 mm and by setting a tension at coating in the length direction of the textile to 0.12 cN/dtex. In addition, curing treatment was carried out for 2 minutes at 190° C. to give a coated fabric having a coating amount of 12 g/m². Properties of the obtained coated fabric were evaluated and shown in Table 1. The obtained fabric had extremely poor air permeability performance. This is because voids may be generated by applying high tension at coating and thus generating movement of warp and weft threads constituting the textile and the coating film at the predetermined position for reducing air permeability may not be formed even though the attached amount was reduced to 12 g/m². As a result, reduction in air permeability may not be achieved.

Comparative Example 3

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 46 warp/2.54 cm, the weft density was 47 weft/2.54 cm and the cover factor was 2,016. At this time, a warp crimp ratio was 4.5% and a weft crimp ratio was 3.5%. To one side of this textile, the same silicone resin as Example 1 was applied by a floating knife coating using a knife having a front end shape of semicircle shape and a front end radius R of 0.3 mm and by setting a tension at coating in the length direction of the textile to 0.07 cN/dtex. In addition, curing treatment was carried out for 2 minutes at 190° C. to give a coated fabric having a coating amount of 22 g/m². Properties of the obtained coated fabric were evaluated and shown in Table 1. Although the obtained fabric had good air permeability performance, a coating amount of 20 g/m² or less was not able to be achieved. This is because the coating resin may penetrate inside of the fabric by movement of the fabric generated at coating and thus the attached amount may exceed 20 g/m² and the coating film may not be formed at the predetermined position for reducing air permeability. As a result, reduction in air permeability may not be achieved. Comparative Example 3 has closer conditions to the present invention in the percentage of fabric crimp ratio and the coating tension compared to Comparative Example 1 and thus, although increase in the attached amount due to low dpf was observed, the low air permeability may be achieved.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Total fineness | dtex | 470 | 470 | 470 | 350 | 470 | 470 | 470 | 470 |
| Filament numbers |  | 72 | 144 | 144 | 108 | 72 | 72 | 72 | 144 |
| Weaving tension | cN/dtex | 0.20 | 0.18 | 0.24 | 0.21 | 0.20 | 0.12 | 0.15 | 0.14 |
| Weaving density(warp/weft) | Filament/2.54 cm | 45/47 | 45/47 | 50/52 | 54/56 | 45/47 | 46/46 | 46/46 | 46/47 |
| Cover factor | — | 1,994 | 1,994 | 2,211 | 2,056 | 1,994 | 1,994 | 1,994 | 2,016 |
| Crimp ratio of base fabric (warp/weft) | % | 3.1/5.6 | 3.9/4.7 | 3.6/5.1 | 3.5/5.4 | 3.1/5.6 | 5.6/3.9 | 5.0/4.2 | 4.5/3.5 |
| Crimp ratio difference of base fabric (weft − warp) | % | 2.4 | 0.8 | 1.5 | 1.9 | 2.4 | −1.7 | −0.8 | −1.0 |
| Fabric tension at coating | cN/dtex | 0.07 | 0.07 | 0.06 | 0.05 | 0.08 | 0.03 | 0.12 | 0.07 |
| Weaving density(warp/weft) | Filament/2.54 cm | 46/46 | 46/46 | 51/51 | 55/55 | 46/46 | 46/46 | 46/46 | 47/46 |

TABLE 1-continued

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Coating amount | g/m² | 15 | 14 | 16 | 18 | 10 | 21 | 12 | 22 |
| Crimp ratio of coated fabric (warp/weft) | % | 3.2/5.8 | 3.2/5.3 | 3.2/5.5 | 3.1/5.7 | 3.0/5.9 | 4.2/4.7 | 2.6/5.8 | 3.8/4.1 |
| Crimp ratio difference of coated fabric (weft − warp) | % | 2.7 | 2.1 | 2.3 | 2.6 | 2.9 | 0.5 | 3.2 | 0.3 |
| Air permeability (@100 kPa) | L/cm²/min | 0.007 | 0.005 | 0.004 | 0.006 | 0.010 | 0.032 | 0.060 | 0.015 |

INDUSTRIAL APPLICABILITY

The coated fabric for airbags according to the present invention can be used in the airbag that maintains extremely air permeability even when the coating amount is low and has light weight and excellent package ability. The coated fabric for airbags can be widely used for not only airbags for head-on collision used for a driver and a passenger in the passenger seat, but also side airbags, curtain airbags, and knee airbags for which an internal pressure retention performance is particularly required and thus has large contribution in industry.

EXPLANATION OF REFERENCE SIGNS

1 Contact part
2 Resin

The invention claimed is:

1. A coated fabric for airbags made by applying 20 g/m² or less of a silicone resin to at least one surface of a textile constituted by synthetic fiber filaments,
wherein the coated fabric has a warp crimp ratio smaller than a weft crimp ratio, the warp crimp ratio being 4% or less and a difference between the weft crimp ratio and the warp crimp ratio being 0.8% to 3.0%, and wherein an air permeability of the coated fabric under a differential pressure of 100 kPa is 0.02 L/cm²/min or less.

2. A coated fabric for airbags made by applying 20 g/m² or less of a silicone resin to at least one surface of a textile constituted by synthetic fiber filaments,
wherein a fabric before coating has a warp crimp ratio smaller than a weft crimp ratio, the warp crimp ratio being 4% or less, and wherein an air permeability of the coated fabric under a differential pressure of 100 kPa is 0.02 L/cm²/min or less.

3. The coated fabric for airbags according to claim 1 or claim 2, wherein a warp tension of the fabric at weaving is not less than 0.16 cN/dtex and not more than 0.40 cN/dtex.

4. The coated fabric for airbags according to claim 1 or claim 2, wherein a whole fineness of the filaments constituting the textile is 200 dtex to 470 dtex.

5. The coated fabric for airbags according to claim 1 or claim 2, wherein a cover factor of the textile is 1,800 to 2,500.

6. A process for producing the coated fabric for airbags according to claim 1 or claim 2, wherein a method for applying the resin is a knife coating method; a front end radius of the knife used is 0.5 mm or less; and a tension in a longitudinal direction of the textile at the knife coating is 0.10 cN/dtex or less.

* * * * *